(12) United States Patent
Xie et al.

(10) Patent No.: US 10,742,601 B2
(45) Date of Patent: Aug. 11, 2020

(54) NOTIFYING USERS WITHIN A PROTECTED NETWORK REGARDING EVENTS AND INFORMATION

(71) Applicants: Michael Xie, Palo Alto, CA (US); Xin Gu, Delta (CA)

(72) Inventors: Michael Xie, Palo Alto, CA (US); Xin Gu, Delta (CA)

(73) Assignee: Fortinet, Inc., Sunnyvale, CA (US)

( * ) Notice: Subject to any disclaimer, the term of this patent is extended or adjusted under 35 U.S.C. 154(b) by 877 days.

(21) Appl. No.: 13/803,871

(22) Filed: Mar. 14, 2013

(65) Prior Publication Data

US 2014/0282816 A1    Sep. 18, 2014

(51) Int. Cl.
*H04L 29/06* (2006.01)
*H04L 29/08* (2006.01)

(52) U.S. Cl.
CPC .......... *H04L 63/0227* (2013.01); *H04L 67/02* (2013.01); *H04L 67/06* (2013.01)

(58) Field of Classification Search
CPC ...... H04L 63/0227; H04L 67/06; H04L 67/02
See application file for complete search history.

(56) References Cited

U.S. PATENT DOCUMENTS

| | | | | |
|---|---|---|---|---|
| 8,869,262 B2* | 10/2014 | Mullick | ............... | H04L 63/0272 709/223 |
| 2002/0184527 A1* | 12/2002 | Chun | ...................... | H04L 63/02 726/4 |
| 2003/0046268 A1* | 3/2003 | Hirabayashi | .......... | G06F 16/958 |
| 2004/0098620 A1* | 5/2004 | Shay | ....................... | H04L 63/02 726/13 |
| 2009/0013089 A1* | 1/2009 | Sullivan | .............. | H04L 67/2814 709/238 |
| 2009/0132718 A1* | 5/2009 | Groll | ...................... | H04W 12/08 709/229 |
| 2011/0154470 A1* | 6/2011 | Grimes | ............... | H04L 63/0263 726/11 |
| 2011/0247073 A1* | 10/2011 | Surasathian | .......... | G06F 21/554 726/24 |
| 2012/0011588 A1* | 1/2012 | Milener | ................... | G06F 21/51 726/24 |
| 2013/0254394 A1* | 9/2013 | Kong | .................. | H04L 63/0281 709/224 |

* cited by examiner

*Primary Examiner* — Mohammed Waliullah

(74) *Attorney, Agent, or Firm* — Jaffery Watson Mendonsa & Hamilton LLP

(57) ABSTRACT

Systems and methods are provided for notifying users within a protected network about various events and information. According to one embodiment, a method includes receiving, by a filtering device, a request originated by an application running on a client device. The method further includes making a determination, by the filtering device, whether the request is to be blocked or allowed, based on the one or more policies. If the request is to be blocked, a notification is provided to a user of the client device regarding the determination by causing the application to display a predefined message.

15 Claims, 13 Drawing Sheets

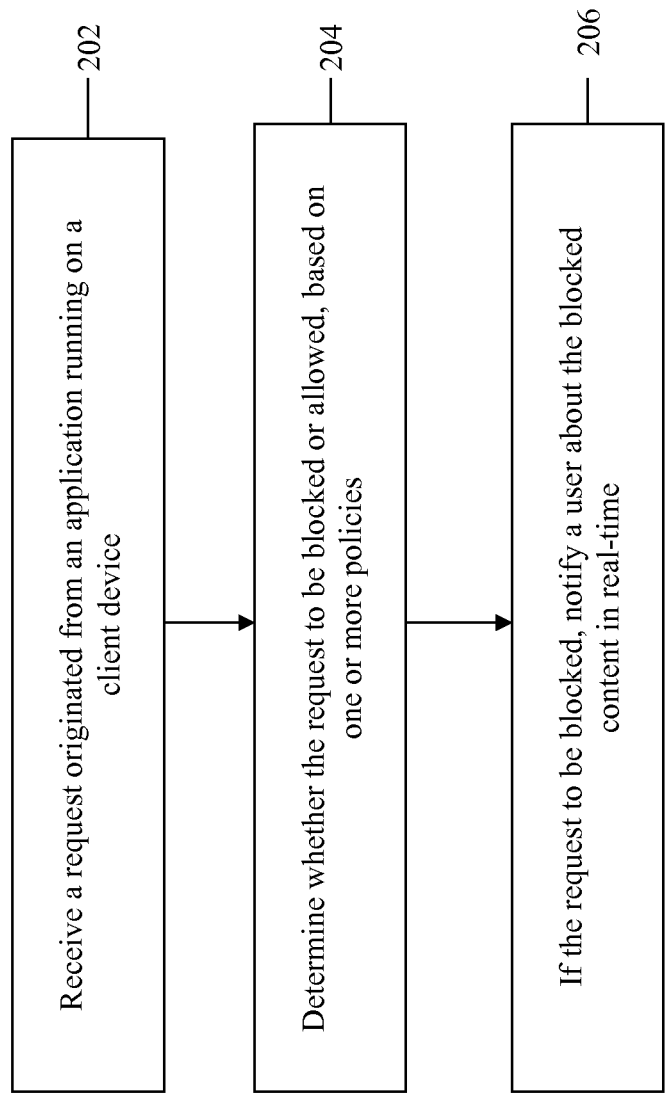

FIG. 4A

| Source IP Address | Target IP Address | Protocol | Source Port | Target port | Action |
|---|---|---|---|---|---|
| 192.168.10.20 | 194.154.192.3 | HTTP | 80 | 80 | Allow |
| Any | 192.168.10.3 | FTP | any | 21 | Block |
| Any | Any | Telnet | Any | 23 | Block |

Policy 400

FIG. 4B

| Policy | Action |
|---|---|
| If the request contains keywords job websites, online job or related keywords | Block |
| if the request includes a URL http://www.abc.com | Record URL and Allow Access for First time |

402

| Policies | Pre-Defined Messages |
|---|---|
| Policy 1 | Skype Application is blocked because of Corporate Policies |
| Policy 2 | Requested URL blocked because it is on unsafe network |
| Policy 3 | Facebook is blocked under the category social networking website |
| Policy 4 | Requested .exe is blocked because of untrusted files extensions |

500

NOTIFYING USERS WITHIN A PROTECTED NETWORK REGARDING EVENTS AND INFORMATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013, Fortinet, Inc.

BACKGROUND

Field

Embodiments of the present invention generally relate to the field of network security. In particular, various embodiments relate to providing information to end users or event notifications via a proxy-injected frame within a web browser, for example.

Description of the Related Art

Threats to enterprise networks may originate internally as well as externally. Therefore, it becomes necessary for enterprises of all sizes to have a secure network to accomplish day-to-day activities. To protect their networks, enterprises commonly rely on filtering devices, such as firewalls. Firewalls are one way of protecting applications, services, data and other resources located within a private or enterprise network. A firewall may control access to host applications and keeps track of attempts, whether authorized or unauthorized, to access the enterprise network. Also, a firewall may provide protection against worms, vulnerable services, and other security threats within the enterprise network or data network. Typically, the firewall may be implemented in the form of a software and/or hardware device. For example, a firewall may be implemented in the form of code on a computer system or a dedicated firewall appliance may be employed at the edge of the network. Various types of firewalls, such as, network firewalls, host-based firewalls, or application-based firewalls are available in the market and each has its own advantages and disadvantages.

In today's world, firewalls work on certain parameters or policies, and based on those policies, data and/or requests may be allowed to pass through the firewall to the intended destination or may be blocked by the firewall. One issue with existing firewalls relates to the lack of feedback provided to end users of computer systems within the protected network. For example, when a user is not authorized to access certain content over the network, the firewall simply blocks the requested content without informing the user. This may create confusion and frustration as to the cause of the lack of response. For example, the user is unable to distinguish among application-related errors, network connectivity issues and dropped requests by the firewall. Additionally, conventional firewall filtering processes, application control, endpoint control and data loss prevention (DLP) solutions lack transparency and fail to inform end users of various events or information regarding violations, enforcement actions and/or quotas. In view of the foregoing, there is a need for methods and techniques to inform users of actions being taken within the protected network.

SUMMARY

Systems and methods for notifying users within a protected network about various events and information are described. According to one embodiment, a method includes receiving, by a filtering device, a request originated by an application running on a client device. The method further includes making a determination, by the filtering device, whether the request is to be blocked or allowed, based on the one or more policies. If the request is to be blocked, a notification is provided to a user of the client device regarding the determination by causing the application to display a predefined message.

According to various embodiments, the request includes information including a source Internet Protocol (IP) address, a destination IP address, the communication port, the type of content requested and/or information regarding the application originating the request.

In one embodiment, the pre-defined message is displayed to the user either through a toolbar, a pop-up window or a proxy-injected frame within a web browser. The pre-defined message provides information to the user notifying the user why the requested content is blocked and the category under which the content is blocked. In some embodiments, information related to application control violations, endpoint control violations, authenticated user information, Secure Socket Layer (SSL) Virtual Private Network (VPN) bookmarks, firewall violations, web browsing quotas, Data Loss Prevention (DLP) violations or the like may be displayed.

In one embodiment, an end user can be notified about the blocked content in real-time, if the application (e.g., a web browser) through which notifications are conveyed is active. Alternatively, notifications may be provided at a later time when the application is launched if the associated event occurred within a predefined time interval.

In one embodiment, the application through which notifications are conveyed to an end user is a web browsing application. In alternate embodiments, the application can be an instant messaging application, a file transfer protocol application, an email client or other applications.

The request can be one of a HyperText Transfer Protocol (HTTP) request, a File Transfer Protocol (FTP) request, a Simple Mail Transfer Protocol (SMTP) request, a Post Office Protocol 3 (POP3) request, an Internet Message Access Protocol (IMAP) request and a Server Message Block/Common Internet File System (SMB/CIFS) request.

According to another embodiment, a network security device may be configured to provide information to end users of a protected network and/or notify end users regarding various events, including, but not limited to, application control violations, end point control violations, web browsing quotas, authenticated user information, firewall violations, DLP violations and the like. The network security device includes a receiving module configured to receive a request originated from an application running on a client device. The network security device further includes a policy determination module configured to, select one or more policies of a plurality of policies; and based on the selected policies, determine whether the request is to be blocked or allowed. Moreover, the network security device includes a notifying module configured to notify a user about the blocked content by displaying a pre-defined message in the context of the application, if the request is blocked.

In one implementation, the network security device can be a firewall, a gateway, a unified threat management (UTM)

appliance or the like that includes a proxy (e.g., a standard web proxy, an SSL proxy for HTTPS or an explicit HTTP and HTTPS proxy).

Some embodiments of the invention include a storage module configured to store various policies, information related to violations, blocked content, authorized users, unauthorized users, or a number of pre-defined messages.

According to an embodiment, the request may be one of: a HyperText Transfer Protocol (HTTP) request, a File Transfer Protocol (FTP) request, a Simple Mail Transfer Protocol (SMTP) request, a Post Office Protocol 3 (POP3) request, an Internet Message Access Protocol (IMAP) request and a Server Message Block/Common Internet File System (SMB/CIFS) request.

In one scenario, the application comprises a web browser, an instant messaging application, a file transfer application or an email application.

Additional embodiments relate to a non-transitory computer-readable storage medium tangibly embodying instructions, which when executed by a firewall, cause the firewall to perform a method for notifying users about blocked content. The method includes receiving a request originated from an application running on a client device. The method further includes determining whether the request is to be blocked or allowed, based on one or more policies. If the request is blocked, notifying the user about the blocked content by displaying a pre-defined message within the application.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2A is a flowchart illustrating a process for providing users with synchronous notifications regarding blocked content in accordance with an embodiment of the present invention.

FIGS. 4A and 4B are exemplary policy tables maintained by a network security device in accordance with an embodiment of the present invention.

DETAILED DESCRIPTION

Figure 1:
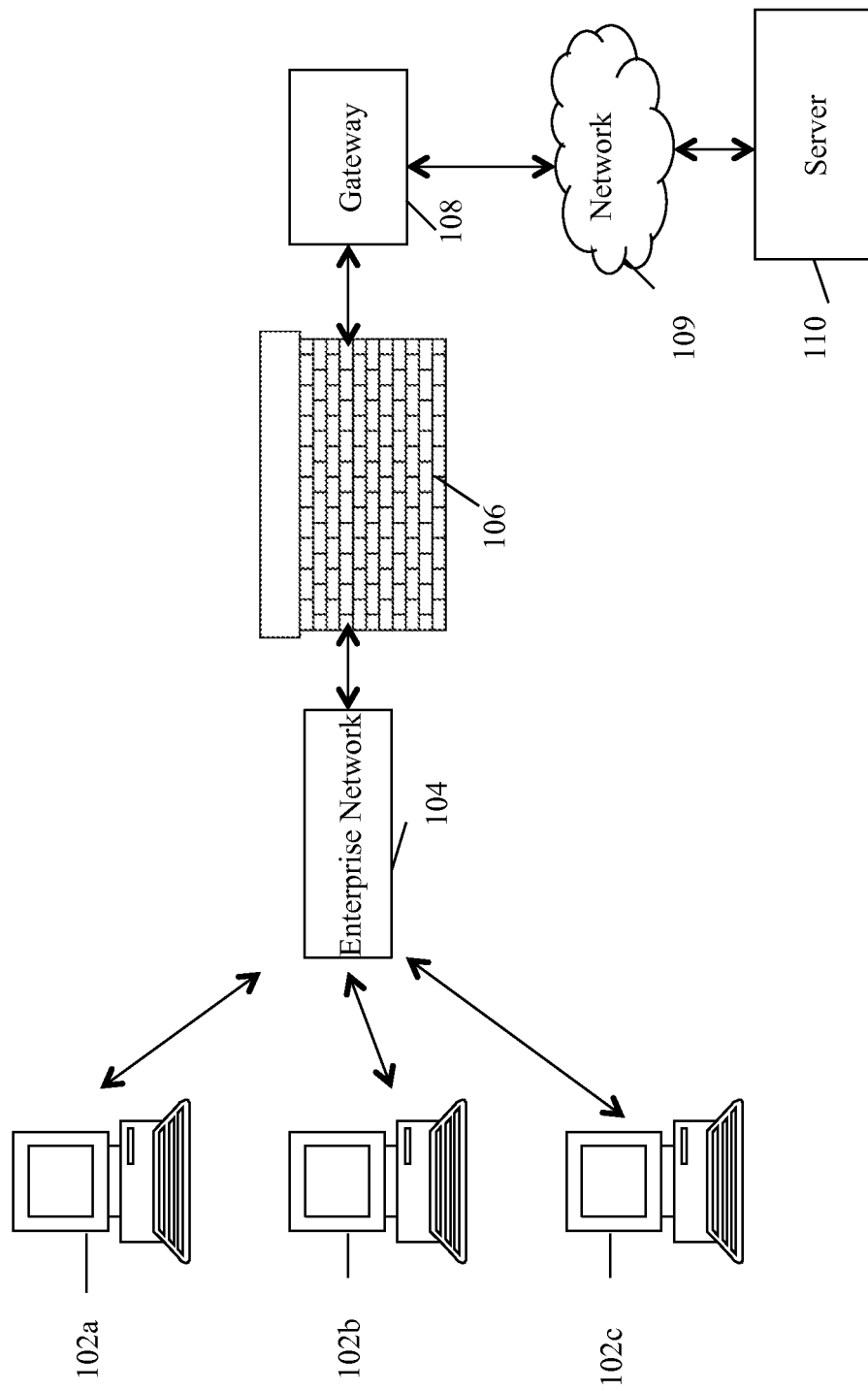
FIG. 1 illustrates an exemplary network environment in which various embodiments of the invention can be practiced.

Systems and methods for notifying users within a protected network about events and information are disclosed. For sake of simplicity and understanding of the invention, embodiments of the present invention are described in the context of a web browser as one example of an application running on a client device. Similarly, an enterprise or corporate network is used as an exemplary usage scenario; however, it is to be understood that embodiments of the present invention are not so limited. For example, various other types of applications are thought to benefit from implementations of the present invention and numerous alternative usage scenarios are contemplated.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "browser" or "web browser" generally refer to any application that allows users to access certain content over a network, e.g., the Internet or Intranet. Examples of browsers include Internet Explorer, Netscape Navigator, Mozilla, Opera, Google Chrome, Safari and the like.

The term "client" generally refers to an application, program, process or device in a client/server relationship that requests information or services from another program, process or device (a server) on a network. Importantly, the term "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "enterprise network" generally refers to a private computer network for sharing information, services or resources within an enterprise or organization. Typically, the "enterprise network" is connected to a public network known as the Internet.

The term "Endpoint protection suite" generally refers to a software-based solution for network clients that offers many security features including Antivirus, web filtering, Antispam detection, Internet Protocol Security (IPsec) and Secure Socket Layer (SSL) encryption, Wide Area Network (WAN) optimization, endpoint compliance, and two-factor authentication. One non-limiting example of endpoint protection suite is FortiClient (FORTICLIENT is a trademark of Fortinet, Inc. of Sunnyvale, Calif.).

The phrase "filtering device" generally refers to hardware, software or a combination thereof in virtual or physical form that control incoming and/or outgoing network traffic by analyzing data packets and allowing or blocking the packets based on a predetermined or configurable set of rules. The analysis performed by a filtering device may include, but is not limited to, simple packet filtering, stateful packet inspection and application layer filtering. Examples of filtering devices include, but are not limited to, firewalls, routers that contain firewall components, intrusion prevention systems (IPS), proxies (e.g., proxy servers), security appliances that performing firewalling functionality, unified threat management (UTM) appliances, gateways that perform firewalling functionality and similar network security devices.

The term "gateway" generally refers to an internetworking system, a system that joins two networks together. A "gateway" can be implemented completely in software, completely in hardware, or as a combination of the two. Depending on the particular implementation, network gateways can operate at any level of the OSI model from application protocols to low-level signaling. Non-limiting examples of a gateway include the FORTIGATE family of network security platforms (FORTIGATE is a trademark of Fortinet, Inc. of Sunnyvale, Calif.).

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "network" generally refers to a collection of software and hardware components, which are inter-connected via a communication channel to share data and/or resources. Examples of various types of networks include, but are not limited to, Local Area Networks (LANs), Wide Area Networks (WANs), Metropolitan Area Network (MANs), Enterprise Private Networks (EPNs) or enterprise network, Virtual Private Networks (VPNs) and Internetworks.

The phrase "network security device" generally refers to a device and/or program that intercepts requests originated by network clients of a protected network. Non-limiting examples of network security devices are firewalls, gateways, UTM appliances and other filtering devices. Firewall functionality within the network security device may implement certain policies or rules, to decide whether the traffic is blocked or allowed. The policies can be defined by an administrator and can be customized as per business requirements. Enabling the firewall helps protect the protected network by providing limited control or access to resources, data or the Internet, while disabling the "firewall" facilitates full Internet access or other resources. Sometimes, the "firewall" may be implemented as a "proxy". Moreover, the "firewall" may be configured to handle different types of traffic.

The term "policy" refers to a set of instructions executed by the network security device, like a firewall, to decide whether the traffic that passes through it should be blocked or allowed.

The term "server" generally refers to an application, program, process or device in a client/server relationship that responds to requests for information or services by another program, process or device (a server) on a network. The term "server" also encompasses software that makes the act of serving information or providing services possible.

Overview

Every organization uses communication platforms such as—email that allows employees to communicate with others. For example, email helps contacting business partners, or colleagues in remote offices. Email provides a channel for communication, but at the same time invites threats from business partners, customers, remote offices or the like. Sometimes, intruders send spam emails, which may be harmful or are sent with an intention to steal confidential information. Further to the above, in every organization different access controls are assigned to different people. For instance, person "A" may be allowed to access a particular folder on the Intranet, however, person "B" may not be allowed to access that folder on the server. Moreover, client devices within the organization are connected to one or more external network(s), such as the Internet, for various purposes and connection to the public Internet sometimes are not trustworthy and may invite attacks like phishing attacks. Therefore, to facilitate secure email communication and limited access to the Internet or enterprise resources, firewalls are deployed within the organization. The firewalls can be deployed at various places, such as the perimeter of the Intranet, client devices or network devices, and gateway.

Today's firewalls are designed to use certain policies or rules to provide controlled access to the Internet, company's resources, information or data. Based on the policies, the firewall either blocks or allows data. In the context of existing firewalls, when the firewall blocks a request or network traffic originated by a user or a customized application, e.g., Skype or MSN messenger, it does not inform the user of the fact that the request or network traffic was blocked or why the request or network traffic was blocked. Instead, existing firewalls typically silently drop packets destined for or directed to the user. As a result, the user may never know the exact reason the network resources are not available or the application is not working. This makes it difficult for the end user to understand whether the application is not working, the server is down, or whether there is a legitimate network problem. In view of the foregoing, embodiments of the present invention provide methods and system for notifying users about blocked content and various events/information.

Exemplary Environment

FIG. 1 conceptually shows an exemplary environment in which various embodiments of the present invention can be practiced. In particular, FIG. 1 is shown to include one or more client devices 102a, 102b, 102c (collectively referred to as 102), a network 104 indicated (interchangeably also referred to as an enterprise network 104), a network security device 106, a gateway 108, and a server 110. Each of the shown client device 102 is connected to network 104, network 104 is further connected to network security device 106, wherein network security device 106 is connected to gateway 108 which in turn is connected to server 110. Each of the shown elements communicates to each other via appropriate protocols.

Client device 102 forms a part of an enterprise and is connected to enterprise network 104, such as, Local Area Network (LAN). Particularly, client devices 102 are within the protected network 104 (e.g. behind the network security device 106 and/or gateway 108). In a LAN, client device 102 is connected to the local network through a network interface or an adapter. Alternatively, client device 102 can be a standalone device, and thus, forms a part of a home network (not shown). A number of applications including web browsers, instant messaging platforms, email or File Transfer applications run on client device 102. For simplicity, embodiments of the present invention will be described in the context of web browser application without limiting the scope of the embodiments of the present invention.

Typically, network 104 includes well-known components, such as routers, gateways, hubs, etc. and allows client devices 102 to communicate via wired and/or wireless media.

Network security device 106 is a device that permits or denies network traffic based on a set of rules and prevents unauthorized access to and from network 104. In the current embodiment, network security device 106 is a firewall and will be referred to as firewall 106 in rest of the description of FIG. 1. Firewall 106 also protects against a number of threats, including but not limited to, spyware, viruses, phishing, pharming, trojans, key loggers, and worms. To this end, firewall 106 prevents malicious codes from accessing or damaging any client device 102 in network 104. Firewall 106 also prevents other type of attacks including Denial of Service attacks, IP spoofing, IP flooding, duplicate IP addresses, etc. This may be accomplished by detecting a port scanning activity. Further, firewall 106 scans the network traffic, and based on the set of rules, determines the action that needs to be taken. The action may be to—allow or block the traffic, update the antivirus, or to record the unauthorized activity, or a combination of these actions. Moreover, firewall 106 is capable of handling both incoming and outgoing traffic, based on the defined rules. Therefore, all messages entering or leaving enterprise network 104 are analyzed by firewall 106 and the messages that do not meet the specified rules are blocked.

Firewall 106 may be implemented in hardware or software or may represent a combination solution configured to protect resources of network 104 from outsiders and provide limited access to the Internet. For example, firewall 106 may form a part of client device 102 in the form of a code, accordingly the functionalities of firewall 106 will be incorporated into client device 102. In other situations, firewall 106 can be a hardware device connected to network 104 to perform the desired functions. Still in other embodiments, firewall 106 can be a part of gateway 108. In the rest embodiments, firewall 106 can be designed as a combination of software or hardware to accomplish the desired tasks. In one embodiment, firewall 106 is configured to support one network protocol. Alternatively, firewall 106 may be configured to support multiple protocols.

Firewall policies are configured to control the flow of network traffic through firewall 106. A typical firewall policy defines a set of rules applied to traffic passing through firewall 106. The firewall policies may be defined to filter packets based on the network address of the source entity, the network address of the destination entity as well as the networking protocol used in the transmission. In other example, firewall 106 may analyze and filter packets based on source and destination IP addresses, type of application originating traffic, and associated communication ports. Other firewall policies may be defined to filter traffic based on a comprehensive list of various items, such as list of banned words and a list of Hyper Text Transfer Protocol (HTTP) Uniform Resource Locators (URLs) to be blocked. Additional policies may utilize a list of authorized or unauthorized users to filter traffic, blocking transmission of specific file types or blocking spams. The firewall policies can be implemented for individual users, all users, user groups, content sources, IP addresses, domains, URLs, etc. Each policy may be associated with a unique identifier, which may or may not be displayed to an administrator.

Generally, an employee of an organization is not allowed to access content related to social networking websites, download files, watch videos, blogs, Yahoo mail, Gmail, or other similar content. Few examples of firewall polices are discussed in this embodiment. In one example, the firewall policy may be—"do not allow analysts to use the Internet during office hours". In another example, the policy may be that ports for protocols—HTTP (80) may be allowed, but ports for other protocols such as the FTP protocol (port 21) or other protocols may be blocked. Other such policy may be to block FTP downloads for user "A". Some examples of general policies are—"do not let any application connect to the unsafe network". Other general policy may be "do not allow users to connect to any social networking websites during business hours". Moreover, the policy may be "don't allow all users to view advertisements or news related content or blogs". Additionally, the policy may be "blocking websites containing objectionable content". Over and above, the firewall policy may be—"don't allow users to download file having extensions .exe, .wmv, .mp3 or any unknown extensions".

The firewall policies may be manually established on client device 102 upon setting a user's profile. In an embodiment, policies may be specified by network administrator using, for example, a graphical user interface or a command line interface of firewall 106.

Although not shown, firewall 106 has two components—one is user space and the second is the kernel space. The user space acts as an interface to firewall 106 and this can be used to enable to disable firewall 106, to change firewall policies or rules, and to log network activities. While the second component filters all network traffic from the application layer. In some embodiments, firewall 106 may be implemented as a combination of one or more modules. For example, firewall 106 may include a policy determination module configured for determining a policy that matches the received request. Firewall 106 may include a toolbar handler configured for embedding a toolbar in the web browsing application. Firewall 106 may include a notification module configured for notifying the user about the blocked content and various other events/information. Moreover, firewall 106 may include a receiving module configured for receiving the request from client device 102. Additionally, firewall 106 may include a storage module configured for storing various policies, blocked content, violations, or so on. Some of these modules can execute in the user space, whereas some may execute in the kernel space. In one example, the toolbar handler may be a part of the user space, whereas the notification module may be a part of the kernel space. The policy structure may be stored in the kernel space of firewall 106, while the endpoint module may be a part of the user space.

Gateway 108 is a device for connecting two different types of network. For instance, gateway device 108 connects enterprise network 104 to the outside network 109—Internet (now referred to as 109). Gateway 108 here acts as an interface between the network 104 and the public Internet 109. Gateway 108 may, for example, translate dissimilar protocols used internally and externally to network 104. Depending upon the distribution of functionality, gateway 108 or firewall 106 may perform network address translation (NAT) to hide private Internet Protocol (IP) addresses used within network 104 for various purposes.

As shown, server 110 is external to the enterprise network 104, which is typically hosted over the Internet 109, for example, web server. Various examples of the web server may include, but are not limited to, Yahoo server, or Google server. Alternatively, server 110 can be an internal server hosted within enterprise network 104 to provide access to information, resources or the like.

In the context of the present example, when the user launches an application on client device 102 to access certain content over network 104 or the Internet 109, the content request is intercepted by firewall 106. Firewall 106 analyzes the content request (e.g., the packet) and allows or drops the content request based on certain policies. If the packet is allowed to pass through, the request is sent by firewall 106 to gateway 108 and the requested content is retrieved from server 110 and displayed on client device 102. But if firewall 106 decides to block the requested content, then no content is displayed on client device 102. Further, firewall 106 notifies the user about the blocked content. For example, firewall 106 informs the user of the fact that the content request was blocked, why the content was blocked and/or the reason for the action (e.g., under which category the content was blocked). In this manner, firewall 106 facilitates user understanding in relation to the unavailability of requested content. Subsequently, appropriate actions can be taken if required. For example, if the end user believes the policies implemented within the network are improper, the end user may consult with the network administrator. The specifics of informing the user of the blocked content and/or various events are described in further detail below. In addition to synchronous and/or asynchronous notifications regarding blocked content, various events/information related to application control violations, endpoint control violations, authenticated user information, Secure Socket Layer (SSL) Virtual Private Network (VPN) bookmarks, firewall violations, web browsing quotas, Data Loss Prevention (DLP) violations or the like may also be communicated to the end user. Similarly, notifications may be provided when firewall 106 allows certain requests.

Figure 2B:
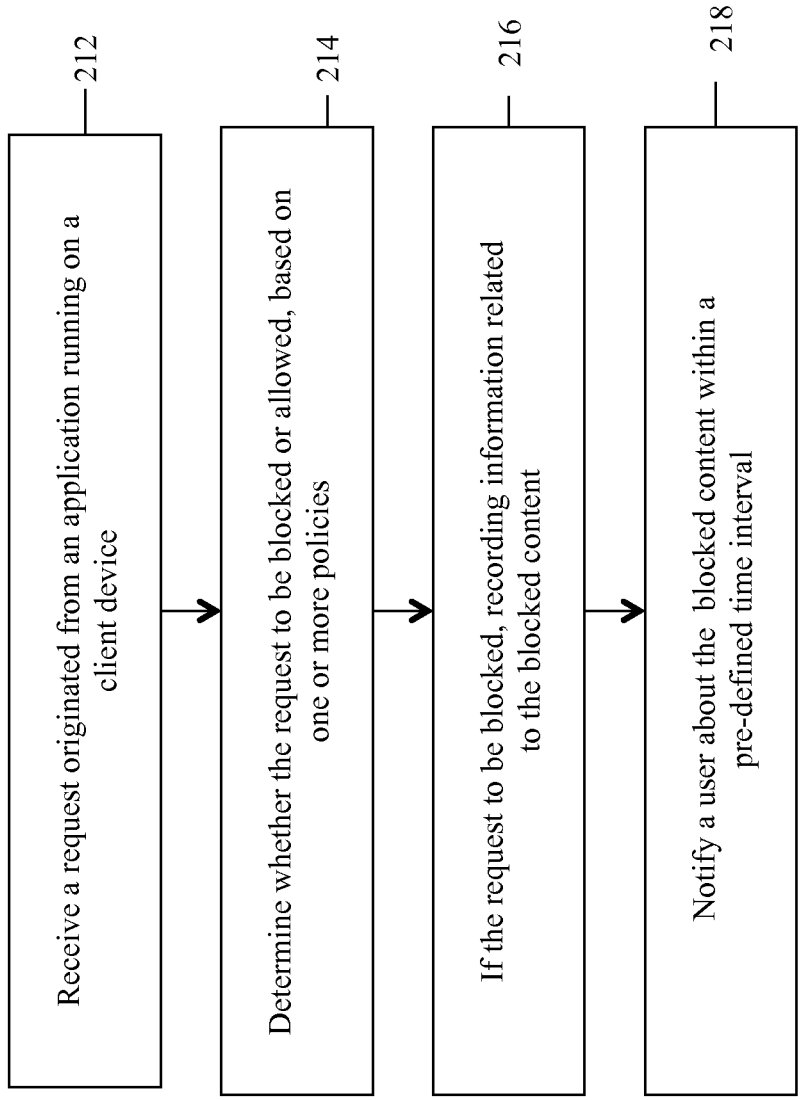
FIG. 2B is a flowchart illustrating a process for providing users with asynchronous notifications regarding blocked content in accordance with an alternative embodiment of the present invention.

FIG. 2A is a flowchart illustrating a process for notifying users about blocked content according to an embodiment of the present invention. For the sake of understanding, a simple example of providing an end user with a synchronous notification is described first before moving on to more complex examples. The present example will be described in the context of displaying notification messages to an end user at the time or very close in time to when a request or requested content is blocked by a filtering device, such as a firewall. However, it is to be noted that embodiments of the present invention are also applicable to asynchronous notifications (e.g., notifications relating to events that took place during a period in which a web browser or other application through which notifications are communicated was not running) and may also be used for displaying other related events including web browsing quotas, endpoint control violations, application control violations. Asynchronous notifications are described with reference to FIG. 2B and display of information related to other events (whether content is blocked or not) is described along with the description of FIG. 10.

The method begins at block 202 with a filtering device receiving a request originated from an application running on client device 102. The request is typically initiated by a user of client device 102 or otherwise responsive to interactions of the user with client device 102. For example, the request may be an HTTP request resulting from user interactions with a web browser running on client device 102. The request may represent a request to access certain content. Those skilled in the art will appreciate the application originating the request is not limited to a web browser. Examples of other applications that may originate resource requests include, but are not limited to, email clients, applications making remote file system requests, Skype, Yahoo! Messenger and other Internet or network-enabled applications.

At block 204, the filtering device (e.g., firewall 106), in addition to enforcing other policies, may check whether the user who initiated the request is authorized or not. If the user is not authorized, then filtering device does not allow the request to proceed further. For example, filtering device may deny the request and respond to the originating application with an error message. If the user is an authorized user, however, then the filtering device proceeds to analyze the request. Here, filtering device may evaluate information included in the request, such as source IP address, destination IP address, type of application, communication port, user profile information or the like. Filtering device then evaluates one or more policies matching the information in the request. Based on the results of evaluating the one or more policies, it is determined whether the request is to be allowed or blocked. According to one embodiment, the selection of the policies may be based on the source IP address, destination IP address, domain name and/or port number. Alternatively, the policies may be selected based on one or more keywords included in the request, type of content requested, type of application, a list of authorized users or the like. In further embodiments, the policy may be based on extension of files names .rm, .wmv, .wma, .mpeg, .ram, or .avi. After selecting the one or more policies, the policies are applied.

At block 206, if the request is blocked, in the present example, the method includes notifying the user about the blocked content by causing a pre-defined message to be displayed to the user by the originating application. In this embodiment, the user is notified about the blocked content substantially in real-time and contemporaneously with the action taken by the filtering device. In alternative embodiments, as described below with reference to FIG. 2B, when synchronous notifications cannot be provided to the end user (e.g., when a web browser is not currently running on the client device) filtering device records information related to blocked content or dropped packets to allow asynchronous notifications to be provided to the end user at a later time when the web browser is active.

Continuing with the synchronous notification process, in one embodiment, based on the blocked content or applied policies, filtering device may determine a pre-defined message and retrieve that stored message. Finally, the message is delivered to the originating application (e.g., a web browser) and is displayed to the user in the context of the originating application. In this manner, the user is provided with real-time feedback about the blocked content. In some embodiments, the synchronous notification message informs the user why the requested content was blocked. For example, the requested content may be blocked as a result of organizational policies, inappropriate content, insecure content, social networking related content, blog related content, online music, online shopping or the like. The notification message can be displayed to the user either through a pop-window or a toolbar in the application.

To illustrate a particular use case, consider a scenario in which a user tries to access a social networking website (e.g., Facebook) and a filtering device applies some policies and makes a determination to block the requested content. After blocking the content, filtering device causes a pre-defined message to be displayed to the user via the web browser. An example of a pre-defined message in this particular scenario might be, "You are not authorized to access the requested content and the content is blocked under the category, social networking website. Please contact your IT administrator for further assistance." In this manner, rather than receiving no feedback, which may create the appearance of a network issue, the user is notified of the blocked content and based on the notification may take appropriate action. For example, the user can contact the IT administrator and request that he/she be allowed access to the Facebook website. If desired, the IT administrator may modify the defined policy for that user.

In certain implementations, the user can be notified about the blocked content within a predefined or configurable time interval (e.g., within 5 minutes of the action taken by the filtering device). For example, in a scenario in which the application (e.g., the web browser) through which filtering notifications are to be displayed is not active at the time a request is blocked, the filtering device may log appropriate information (e.g., the action and a timestamp) to allow an asynchronous notification to be provided to the user at a later time when the application is active. When the application is launched by the end user at a later time, the information related to blocked content or other events may be displayed if such information remains timely as defined by a pre-defined or configurable time interval.

To explain this scenario, it can be assumed that the user tries to access music website: http://www.musiconlineindia.com. As discussed above, filtering device evaluates the request and decides to block the request. Accordingly, the requested content is not displayed to the user. And the user closes the web browser and opens the web browser after 5 minutes. After 5 minutes, filtering device searches it local database and identifies that the user tried to access music website few minutes back and that was blocked. So here, filtering device retrieves the appropriate message from the database and include that message in the web browser. The message notifies the user about the content blocked previously. One exemplary message can be—"the requested music website was blocked as this website is listed as banned URL". In certain cases, during searching, filtering device may identify that there were 10 requests received from the user in the last 5 minutes and all were blocked. Then, filtering device decides and determines for which requests the user needs to be notified. For example, filtering device may choose first two requests which were blocked and notifies the user about those 2 blocked requests. But, if configured in that way, filtering device can notify the user about all the requests which were blocked. Additionally, filtering device can be configured in any desired manner to notify the user about the blocked content and other associated events.

Looping back to above description, if the request is not blocked, then the request is forwarded to gateway 108. Gateway 108 is connected to server 110 through the Internet 109 and the requested content is retrieved from server 110 and displays that content at client device 102. In some situations, filtering device checks if any packet is dropped and if there is need to notify. If no packet is dropped, then filtering device simply forwards the request to gateway 108 and follows the process as discussed above. Otherwise, filtering device checks if there is any notification supported protocol? If no, then filtering device works in the normal mode of forwarding the request to gateway 108. Else, filtering device redirects the request to an internal proxy (although not shown in FIG. 1). The internal proxy then responds with a web page having toolbar embedded in the web browser. The toolbar displays the message to notify users about the blocked content.

In general, filtering device maintains a policy table. The policy table includes a number of policies and corresponding action to be taken by filtering device. One such exemplary table 400 is shown in FIG. 4A. The table includes information such as—source IP address, destination IP address, communication protocol, source port, destination port, and action. When combining the given information a policy is formed. The policy can be interpreted as if the request is from any IP address, and is targeted to any IP address, but if the protocol is Telnet and the target port is 23, then the action is Block. Filtering device immediately blocks such requests. In similar manner, the other policies given in the table can be interpreted and applied.

Another exemplary policy table 402 is shown in FIG. 4B. In the shown embodiment, filtering device maintains policies in a different format. As depicted, filtering device stores policies in a conditional format. One example is—"If the request contains keywords job websites, online job or related keywords, then the corresponding action as shown is block the request". Further, if the request includes a URL http://www.abc.com, then the corresponding action is record the URL and allows accessing the URL for the first time. The policy table, policies and its format as shown in FIGS. 4A and 4B are just exemplary and have been simplified for brevity. Those of ordinary skill in the art will appreciate the policy table may include more information than as shown and may store policies in any desired manner.

Figure 5:
FIG. 5 shows a table listing various pre-defined messages in accordance with an embodiment of the present invention.

Referring to FIG. 5, it shows a list 500 of pre-defined messages to be displayed in the web browser application. In the current embodiment, the pre-defined messages are included based on the applied policies. Various examples of pre-defined messages are—"Skype application is blocked because of corporate policies". This message is displayed when firewall 106 applies policy 1. Other illustrative message is—"Requested URL is blocked because it is on unsafe network". There are many more pre-defined messages which can be maintained by firewall 106 in its local database.

Example

Figure 3:
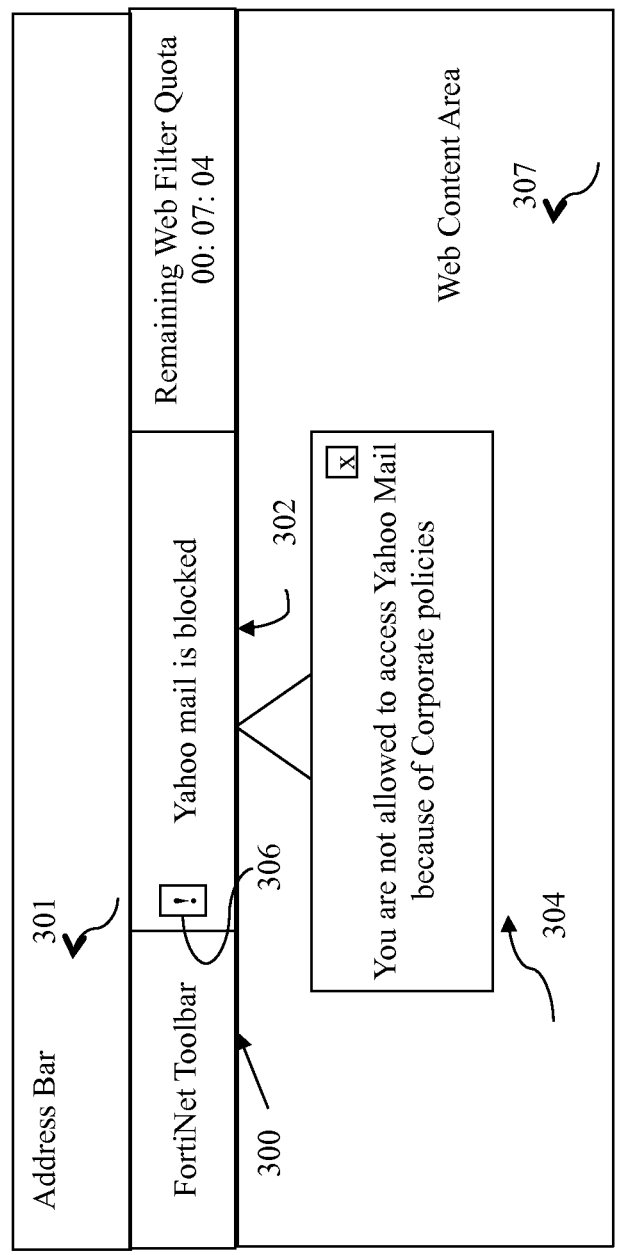
FIG. 3 depicts a toolbar including a notification message in accordance with an embodiment of the present invention.

To facilitate understanding of embodiments of the present invention, an example is now provided. It is to be understood that embodiments of the present invention are not limited to the exemplary embodiments described above or to the particular examples. In this example, it can be considered that the user initiates the web browser on client device 102 and wishes to access content—Yahoo mail. Before client device 102 is connected to the Internet, firewall 106 intercepts the request. Firewall 106 then checks whether the user is allowed to access the requested content based on one or more stored policies. So the matching policy here may be that—"if the request contains keywords Yahoo mail, Yahoo messenger, then block the request for all the users". Based on such policy, firewall 106 blocks the request and does not display the requested content to the user. Immediately after blocking, firewall 106 notifies the user about the blocked content either through a pop-up message, toolbar or other means. The notification includes the message stating why the requested content is blocked. For instance, the reason may be "organization policy". To this end, an exemplary notification message is shown in FIG. 3. FIG. 3 here depicts a conventional web page that includes an address bar 301, and a web content area 307 and these need not be described here. In the context of the present invention, FIG. 3 shows a toolbar 300 having a message section 302 displaying notification on applications blocked by firewall 106. As shown in the section 302, the notification message is—Yahoo Mail is blocked. Further, when the user clicks on an element 306, a detailed notification message 304 is shown. The message can be "You are not allowed to access Yahoo Mail because of corporate policies". This way, the present invention makes the user aware about the blocked content. Accordingly, any necessary actions can be taken by the user. If desired, the administrator can change the policy.

FIG. 2B illustrates a method flowchart for asynchronous notifications generated by the filtering device. The method begins at block 212 with the filtering device receiving a request originated by a user using an application running on client device 102.

At block 214, the filtering device (e.g., firewall 106), in addition to enforcing other policies, may check whether the user who initiated the request is authorized or unauthorized user, as explained above in detail. If the user is an authorized user, then the device allows the user to proceed further. As a next step, the filtering device may evaluate information included in the request and based on that the filtering device evaluates one or more policies matching the information in the request and subsequently, determines whether the request is to be allowed or blocked.

At block 216, if the request is blocked, the filtering device records information (e.g., the action, reason and timestamp) related to the blocked content. Then, at 218, the user is notified about the blocked content within a pre-defined time—5 minutes or at a time when the application is launched by the user. According to this embodiment, asynchronous notifications are generated, meaning that the web browser is not currently running on the client device. Accordingly, the filtering device records information related to blocked content or dropped packets to allow asynchronous notifications to be provided to the end user at a later time when the web browser is active.

In an example, it can be assumed that the user initiates an application (e.g., web browser) on the client device and requests to access Gmail and based on the pre-defined policies, the filtering device decides to block the request. Now, the filtering device requires informing the user about the same through the web browser, but the filtering device determines that the web browser through which filtering notifications are to be displayed is not active at the time a request is blocked. As a next step, the filtering device logs appropriate information—Gmail blocked (action) at 11:30 AM (timestamp) for the user. Now when at a later time, the user launches the web browser, the filtering device informs the user about the blocked content, in this way, asynchronous notifications are provided to the user. In other scenarios, if the filtering device identifies that pre-defined time or pre-configured time has lapsed and the web browser still remains inactive, then the filtering device automatically launches the browser so that the notification messages can be displayed to the user. In this way, the user is made aware about the blocked content and subsequently, the user may take appropriate action at his or her end.

Exemplary Block Diagram

Figure 6A:
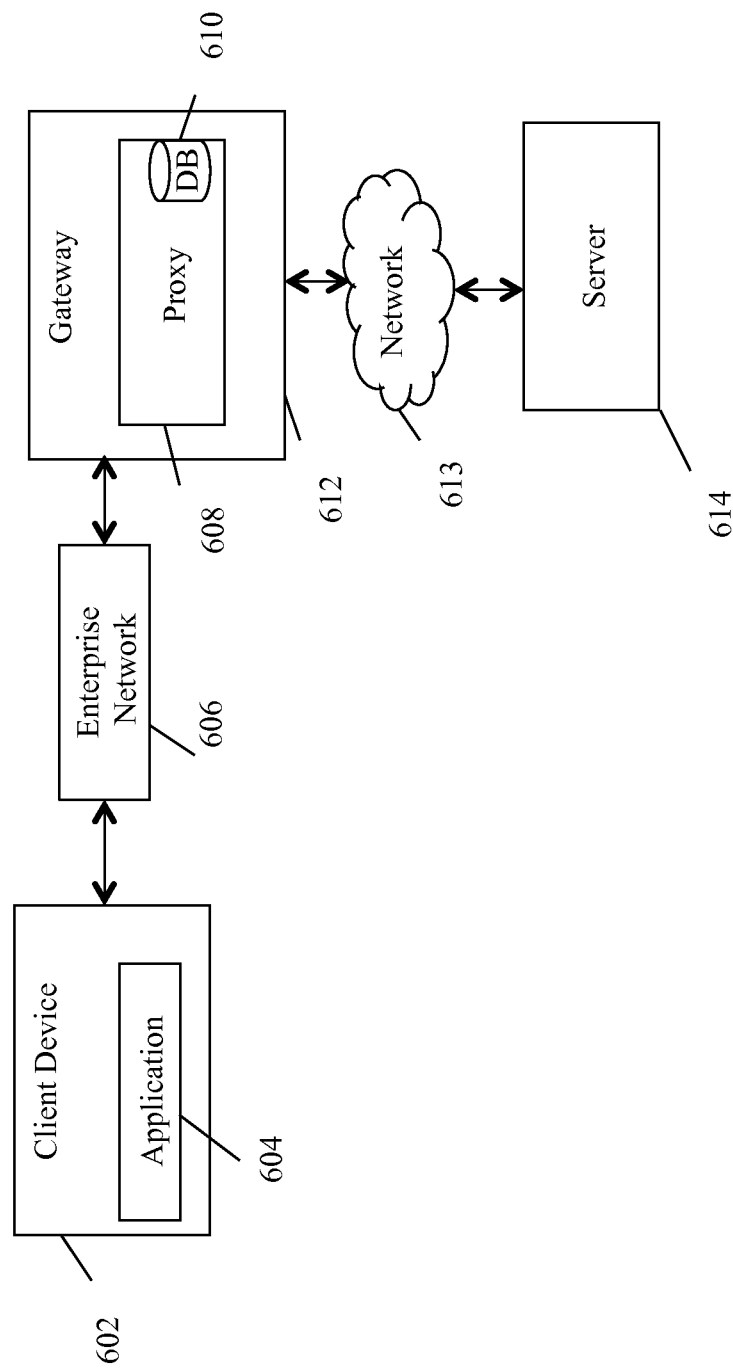
FIG. 6A is a block diagram conceptually illustrating interaction among various functional units in accordance with an embodiment of the present invention.

FIG. 6A is an exemplary block diagram having various functional modules interacting with each other for notifying users on blocked content. In particular, FIG. 6A shows a client device 602, a network 606 (interchangeably referred to as enterprise network 606), a gateway 612, and a server 614. Client device 602 includes an application 604 and gateway device 612 includes a proxy module 608 and proxy module 608 further has a database 610. The shown components are coupled to each other and communicate using various communication protocols as known in the art. Network 606 may be configured to intercept data transmissions formatted in accordance with various networking protocols including, without limitation.

As shown in FIG. 3, client device 602 is a part of an enterprise and connected to enterprise network 606. In other embodiment, client device 602 can be an individual device. Client device 602 may be personal computers (PCs), handheld devices, multi-processor systems, microprocessor-based programmable consumer electronics, network PCs, minicomputers, tablet PCs, laptop computers, consumer appliances having a microprocessor or microcontroller, routers, gateways, or hubs. As indicated, client device 602 includes application 604. Various examples of application 604 are Microsoft Outlook, Web browser, Yahoo Messenger, or the like. Each of the applications communicates using the known protocols. For example, the MS Outlook uses SMTP protocol for communication, while HTTP is the protocol used for any communication through web browser, and YMSG is the protocol for messaging over Yahoo!. For the sake of simplicity, embodiments of the present invention will be described in the context of web browser; however, those skilled in the art will appreciate the invention is not so limited as notifications can be provided by other types of applications.

Initially, a user on client device 602 launches a web browser and initiates a request to access certain content over network 606 or the Internet. The request includes information related to user's profile information, source IP address, destination IP address, communication port, application type, or service type. The request can be:—Simple Mail Transfer Protocol (SMTP), Post Office Protocol 3 (POP3), Internet Message Access Protocol (IMAP), HyperText Transfer Protocol (HTTP), File Transfer Protocol (FTP), Telnet Server Message Block/Common Internet File System (SMB/CIFS), instant messaging (IM) protocols (e.g., AOL Instant Messenger (AIM), MICROSOFT Network (MSN) messenger, YAHOO! messenger, SKYPE), and peer-to-peer (P2P).

As shown, proxy module 608 receives the request sent by client device 602. Proxy module 608 first checks whether the user is an authenticated user or not. To this end, proxy module 608 checks the user's profile information against a list of authorized users. If the user is not an authorized user, proxy module 608 does not proceed with the request. But if the user is an authorized user, then proxy module 608 processes the request. As a next step, proxy module 608 retrieves the information included in the request and finds a policy matching the retrieved information. In particular, proxy module 608 analyzes source IP address, destination IP address, or service port to find a matching policy. Thereafter, proxy module 608 applies the found policy to determine whether the request is allowed or not.

If the request is allowed, proxy module 608 allows the request to pass through it and communicate to gateway 612. Gateway 612 then sends the request to server 614—web server, for example, connected over the network 613, Internet. The requested content is then retrieved from server 614 and sent back to gateway 612. Gateway 612 then sends the retrieved web page to proxy module 608 and finally, the requested content in the form of the web page is displayed on client device 602.

If the request is blocked by proxy module 608, the requested content is not displayed to the user. Immediately after blocking the requested content, proxy module 608 notifies the user of client device 102 about the blocked content. For example, proxy module 608 notifies the user—Gmail is blocked, if the end user requests for Gmail. The notification can be displayed to the user either through a pop-up box or through a toolbar. In an embodiment, the toolbar in the web browser is embedded using one or more scripting languages, such as Java. For notifying, proxy module 608 first identifies a pre-defined message of multiple pre-stored messages. Proxy module 608 then retrieves the identified message and displays it in the web browser application. The pre-defined message is identified based on the policy applied by proxy module 608. The pre-defined message notifies the user about what content is blocked and why the content is blocked.

Figure 7:
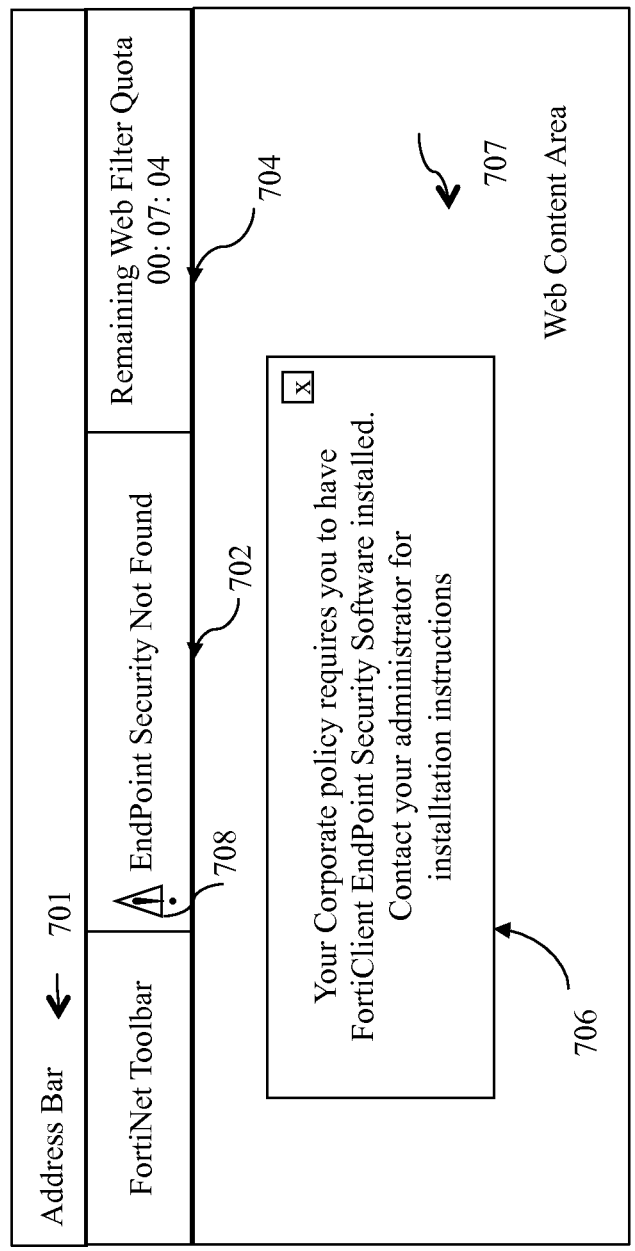
FIG. 7 illustrates a toolbar including a notification message and other information in accordance with an embodiment of the present invention.

In one example, it can be assumed that the user tries to access certain content available on the Internet and proxy module 608 blocks the content. One example of a notification message can be as shown in FIG. 7, marked as 702, Endpoint security Not Found. When the user clicks on the element 708, a detailed notification message 706 is displayed—"Your Corporate policy requires you to have FortiClient EndPoint Security Software installed. Contact your administrator for installation instructions". In another example, it can be considered that the user wishes to access a file on the Intranet and the file is blocked. Accordingly, the notification message can be—"Access denied and you are not authorized to access ABC file on the server". Accordingly, the user can contact the administrator and ask him to change the policy to get access to the desired file. In further example, it can be considered that the user wishes to access a website—http://www.onlineshop.com and proxy module 608 blocks the request. Here, the notification message can be—"Online shopping URL is blocked as the requested URL is on unsafe network". In another example, let us assume that the user wishes to download a video file and proxy module 608 blocks the content. Here, the notification message may be—"Blocked download file as it has extension .wmv and such extension files are blocked as per corporate policies". In an additional example, it can be considered that user tries to send a file sized 15 MB to anywhere outside network 109 and proxy module 608 blocks the file. Based on this, the notification can be—"Failure delivery of 15 MB sized file as the file exceeds the maximum limit according to corporate polices". In addition to the above, FIG. 7 also shows an address bar 701 and a web content area 707 and these are known in the art.

In some embodiments, proxy module 608 may be a part of client device 602; accordingly, all the functionalities can be incorporated in client device 602. The functionalities of proxy module 608 may be implemented as a code on client device 602. Proxy module 608 may be a component of the operating system or a separate application or program running on client device 602. While in rest of scenarios, proxy module 608 may be present anywhere inside enterprise network 606.

Figure 6B:
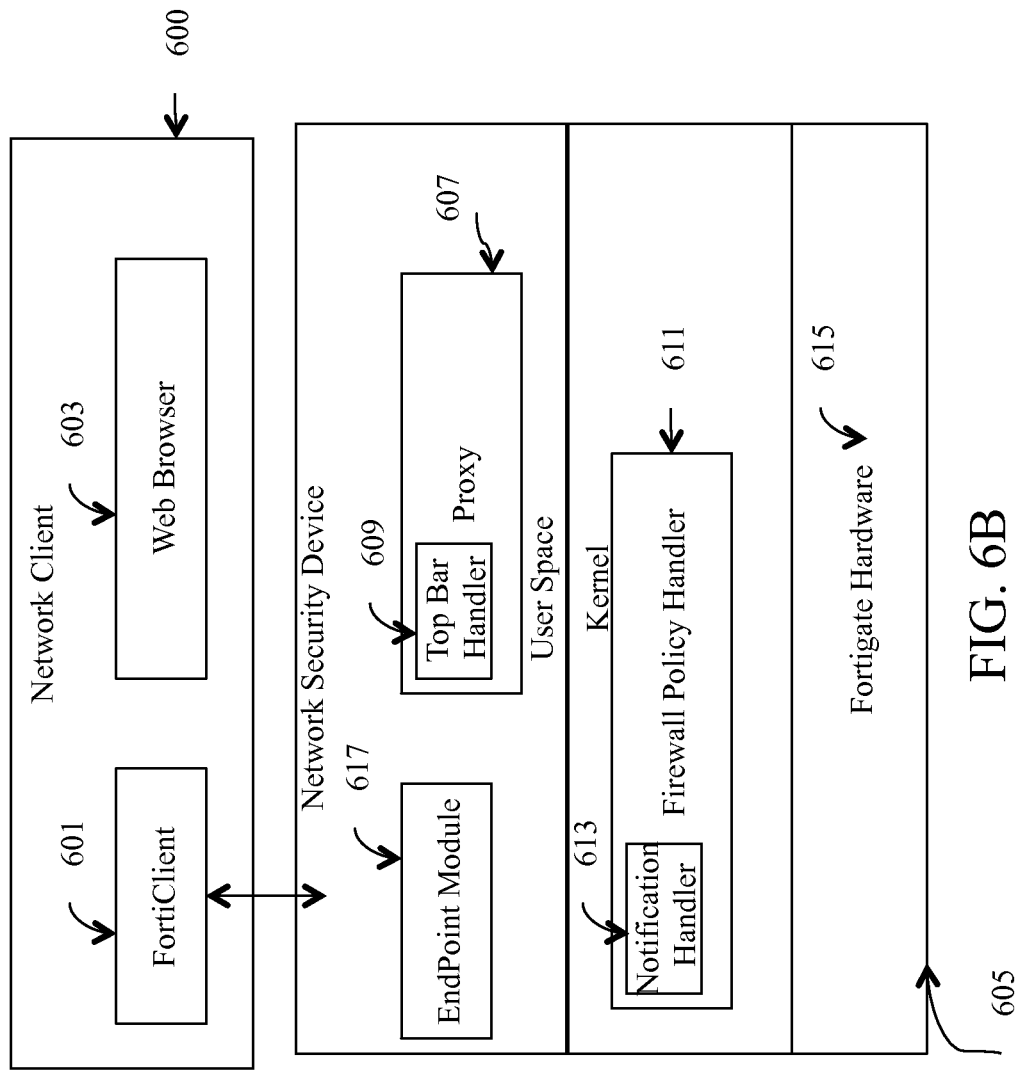
FIG. 6B is a block diagram conceptually illustrating interaction among various functional units in accordance with an alternative embodiment of the present invention.

In one embodiment, proxy module 608 may include an interception module (not shown in FIG. 6A or FIG. 6B). The interception module monitors the attempts made by applications to access content on the network. The interception module captures all the attempts and determines what user is making the attempt, what application or service is making the attempt, and executes a firewall policy check to determine whether the user or application are allowed to connect to network 606 to access the requested content. In some embodiments, alerts can be generated to notify administrators of new issues and threats.

Further, proxy module 608 maintains a database 610. Database 610 stores all the policies, users profiles, list of authorized users, a list of unauthorized users, information about blocked content, dropped traffic, or pre-defined messages. The pre-defined message can be stored in any format. Database 610 also stores information of traffic allowed or blocked previously. The information stored in database 610 is retrieved when desired. Furthermore, proxy module 608 can be at least one of: web proxy, http proxy, https proxy and so on.

Proxy module 608 implements policies stored in database 610 based on individual users, user groups, content sources, IP addresses, domains, URLs, etc. Proxy module 608 can be used for threats, including but not limited to, spyware, viruses, phishing, pharming, trojans, key loggers, and worms. Proxy module 608 may be customized as required in terms of policies or rules settings. Few examples of the defined policies are described here. In some embodiments, proxy module 608 checks client device 602's IP address against an administrator blacklist and further the server IP address is checked against the administrator blacklist. If either IP address is blacklisted, then proxy module 608 blocks the requested content. In some embodiments, the blacklist is prepared based on domain or URL. In the similar manner as above, when the requested domain or URL is found in the defined blacklist, the access is denied. But if the client IP addresses or server IP address or domain or URL are whitelisted, then access is granted and the web page is retrieved and displayed to the user. In another example, if a certain IP address outside enterprise network 606 is accessing too many files from a server (for example server 614), proxy module 608 may block all requests to and from that address. In other example, proxy module 608 may block the request if intended for a destination server whose IP address is found in a blacklist. Proxy module 608 may block all access to certain domain names, or allow access to only specific domain names. Further, proxy module 608 may restrict access to/from specific protocols for some machines, while rest machines are allowed to access. For example, some machines may be allowed to access port 21, but port 21 may be blocked on others machines.

In some embodiments, proxy module 608 can be configured using a command line interface (CLI). The CLI requires typing command or uploads batches of command from a text file like configuration script. The CLI may be any type and form of command line or text-based interface, such as a command line provided by the operating system. In certain implementations, proxy module 608 can be configured via Graphical User Interface (GUI). The GUI may be any type and form of graphical user interface and may be presented via text, graphical or otherwise, by any type of program or application, such as a browser. In one embodiment of the present invention, proxy module 608 is implemented in the OS kernel. In an alternative embodiment, proxy module 608 is implemented in the form of an application in the user space provided by the operating system.

An alternative representation of FIG. 6A is shown in FIG. 6B. FIG. 6B is shown to include a network client 600, and a network security device 605—FortiGate, for example. The network client 600 includes a FortiClient 601 and a web browser application 603. As shown, the network security device 605 is a combination of software and hardware that includes a user space, kernel space, and underlying FortiGate hardware 615. As shown, endpoint module 617 and proxy 607 execute in user space, whereas firewall policy handler 611 executes in kernel space. A user of network client 600 launches a web browser application and generates a request to access certain content over the network—may be Intranet or Internet. Network security device 605 intercepts the request and further interacts with firewall policy handler 611. Firewall policy handler 611 decides whether the request is to be allowed or blocked, based on pre-stored policies. If the request is to be allowed, the request is passed through the FortiGate hardware 615, otherwise, the request is blocked, which means that the requested content is not displayed to the user. Instead a notification message on why the content is blocked is displayed to the user. To this end, notification handler 613 retrieves a notification message based on the blocked content or applied policy and communicates the notification message to the top bar handler 609; top bar handler 609 being a part of proxy 607. Top bar handler 609 embeds a toolbar in the web browser application for displaying notification messages to the end user. Alternatively, the notification messages can be displayed through FortiClient 601. In one example, the notification message can be "you are not allowed to connect to the XYZ application as it seems insecure". Based on the notification message, proxy 607 or top bar handler 609 calls endpoint module 617 that checks XYZ application for viruses. Endpoint module 617 does other functions as discussed above.

In other embodiments, proxy module 608 inserts the toolbar in application 604 to display various events or information including application control violations, endpoint control, web browsing quota, user ID, SSL-VPN bookmarks, firewall violations, DLP violations, etc. Each of these will be discussed in detail below.

Application Control Violations

In case of application control violations, proxy module 608 identifies applications that may violate the defined policies or may reduce network security. Such applications may be social networking, peer-to-peer, instant messaging, video streaming, Adobe Flash Player, or file sharing. Such applications may be blocked or flagged by proxy module 608. In one example, proxy module 608 can easily stop known or unknown attacks that are hidden in a PDF file by preventing writing code on client device 602. Also, proxy module 608 can control any unwanted applications without blocking all websites.

EndPoint Control

Endpoint Control ensures that client devices, also known as endpoints, meet security requirements, otherwise they are not permitted access to data, resources. In many implementations, Endpoint Control can enforce use of antivirus protection on windows, Linux, Unix, MAC or virtual machines, web content filtering, updating of antivirus signatures, installation of certain applications. Endpoint Control also includes web security that scans for malware and blocks malicious websites. Endpoint Control includes enforcing corporate policies for protecting data and resources. Additionally, Endpoint Control checks whether all signatures are up-to-date and the personal firewall is enabled.

Web Browsing Quota

Web browsing quota allows a user to access the web for a pre-defined time limit. The quotas can be applied on a daily basis, weekly basis or monthly basis. Quotas can be reset by the administrator when desired midnight of everyday, for example. Further, the quota is applied to each user individually so as to identify each user. The quotas can further vary for specific user groups, file types, URLs, or times of day. For example, the web browsing quota for a user "A" may be 15 minutes per day during lunch hours, but the web browsing quota for a user "B" may be 1 hour during break time. In another example, the quota rule may include a usage of 15 MB per user for all browsing activities during business hours, but allow unlimited bandwidth usage after office hours. Other quota rules may set a limit of 5 MB day per user for PDF files, except for the sales department. Moreover, one quota rule may allow a user to download only 10 image files in a day.

Figure 8:
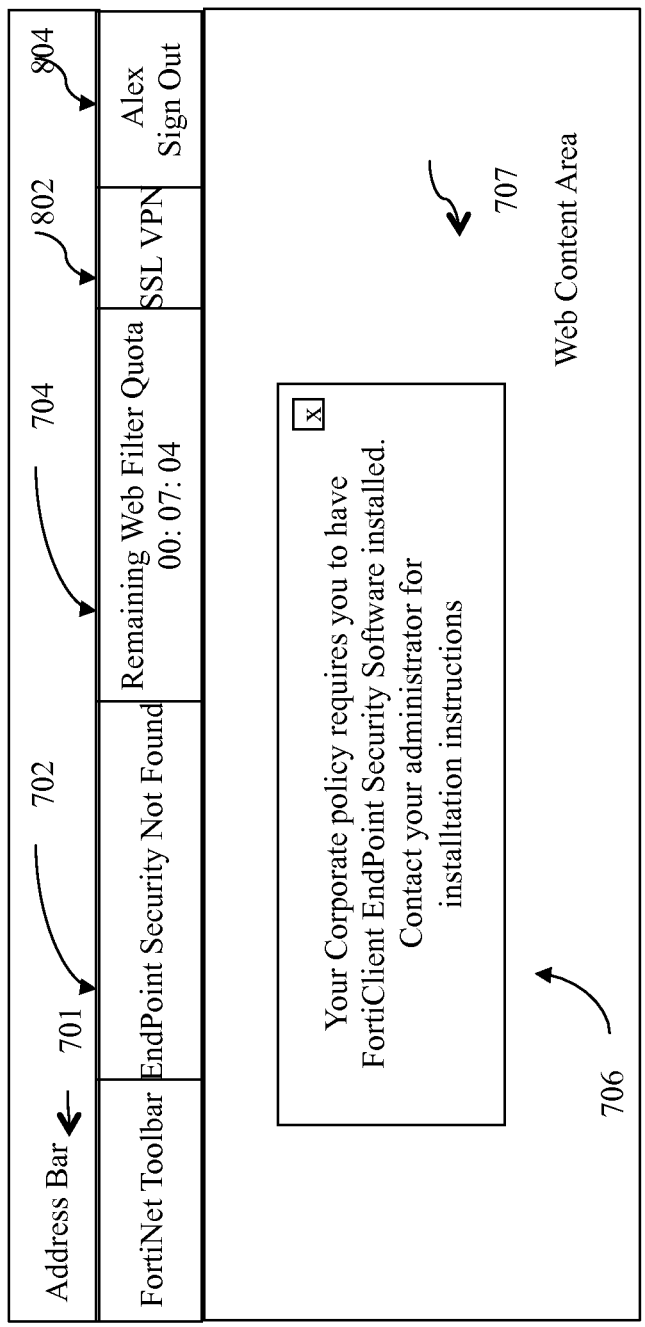
FIG. 8 illustrates a toolbar displaying various events to a user in accordance with an embodiment of the present invention.

To this end, proxy module 608 determines the quota allowances, and monitors web usage. Proxy module 608 checks each web page visited by the user and the classification of each visited page they visit is checked, and adjusts the user's remaining available quota for the category or classification. Proxy module 608 raises the alarm when the security policy is violated. To support this, FIG. 8 shows a toolbar displaying the remaining web quota for a user. As shown, the remaining web quota for the user—7 minutes and 14 seconds, marked as 704. Based on the remaining web quota, the user can manage their browsing activities accordingly. Proxy module 608 may be configured to display other information in the toolbar including—quota allowances, or exhausted web quota (although not shown) along with the remaining web quota.

SSL VPN Bookmarks

SSL VPN (Secure Sockets Layer virtual private network) extends a Virtual Private Network over the Internet, enabling remote users to securely access corporate resources as if they were located on the corporate network. SSL VPN does not require any installation of specific software or applications. In short, SSL-VPN delivers remote network access from a web browser without requiring any additional software or setup. To access corporate servers or applications, the user is not required to remember the names or IP addresses of machines because all the resources can be made available as bookmarks. Such bookmarks are displayed in the toolbar. Additionally, the toolbar displays VPN connection details marked as 802 in FIG. 8. Here, it shows that the user is connected in SSL VPN mode.

To further explain the above concept, the user firstly logs into the SSL VPN portal, and selects a port forward bookmark configured for a specific application. The bookmark defines the server address and port as well as which port to listen to on the user's client device. When the user connects to the SSL VPN tunnel, he is authenticated before being allowed to use the internal network resources. This can be as simple as performing authentication using their own passwords, or One Time Password (OTP). The web portal can include bookmarks to connect to internal network resources.

User Authentication Information

The toolbar displays user authentication information. For example, the toolbar displays a username marked as 804 in FIG. 8. If the user is authenticated either by proxy module 608 or gateway 612, then, the user authentication information is displayed in the toolbar with an option to de-authenticate. Sign-out can be used to de-authenticate the use.

Firewall Violations and DLP Violations:

Along with the above information, the toolbar may display information relating to firewall violations or DLP violations.

Figure 10:
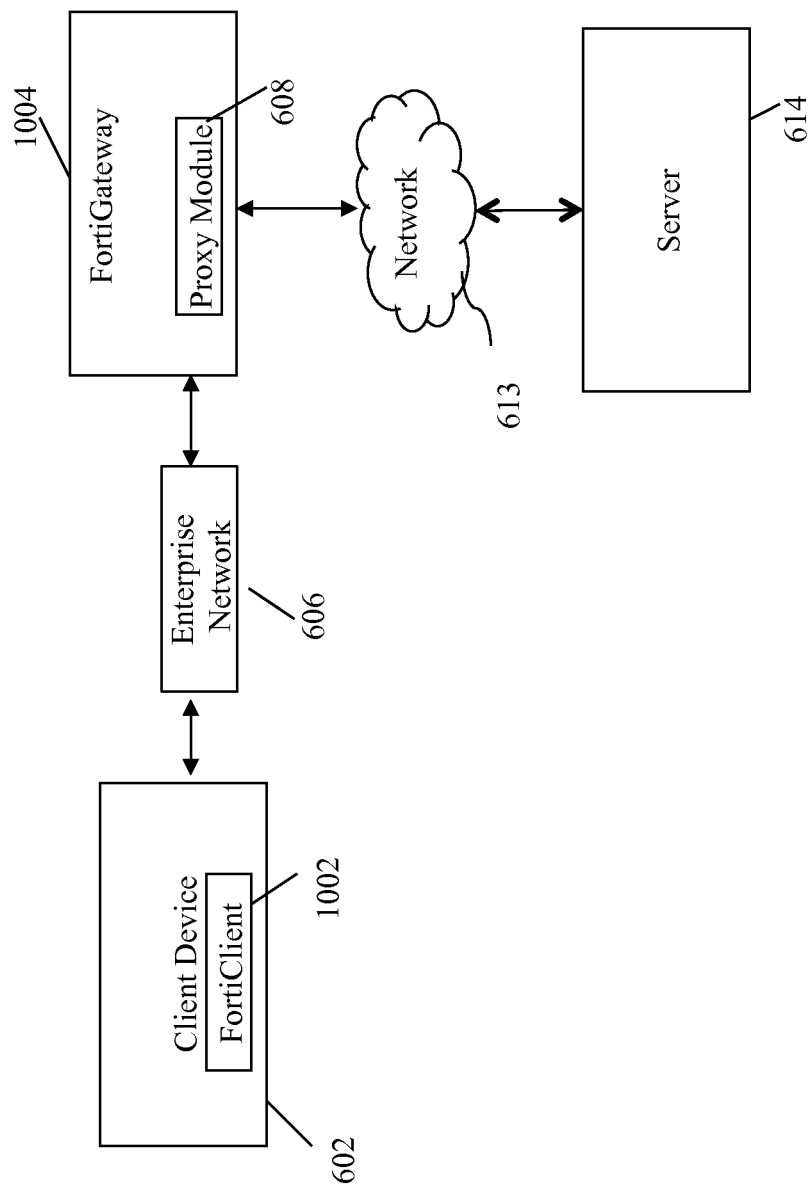
FIG. 10 is an alternative block diagram including FortiClient and FortiGate for notifying users.

FIG. 10 is another alternative embodiment of FIG. 6A or FIG. 6B as discussed above. In particular, FIG. 10 is shown to include a FortiClient 1002 and a FortiGate 1004 and rest of the elements—client device 602, network 606, proxy module 608, and server 614 are similar as shown in FIG. 6A or FIG. 6B. As shown, client device 602 includes FortiClient 1002, and FortiGate 1004 includes proxy module 608. FortiClient 1002 and FortiGate 1004 are provided by Fortinet, Inc. of Sunnyvale, Calif. (FORTIGATE is a trademark or registered trademark of Fortinet, Inc.). FortiClient 1002 communicates with FortiGate 1004 using proprietary protocols.

FortiClient 1002 is software installed on client device 602. In the earlier embodiments, proxy module 608 or firewall 106 (of FIG. 1) notifies the user about the blocked content. But in the current embodiment, FortiClient 1002 is configured to inform the user about the blocked content instantly. To explain in detail, proxy module 608 receives the request from client device 602 and decides whether the request to be blocked or allowed. In case the request to be blocked, proxy module 608 communicates it to FortiClient 1002. Here, FortiClient 1002 informs the user about the blocked content. In detail, FortiClient 1002 retrieves a message from database 610 of proxy module 608 (as discussed with reference to FIG. 6A) and displays that message to the user. The message informs the user on what content is blocked and why the requested content is blocked. The notification message is displayed to the user instantly through a toolbar, for example. In particular, the notification message is included in the toolbar and then the toolbar is inserted or embedded into a web browser application running on client device 602 and finally the message is displayed through it. Along with notifying the user, FortiClient 1002 performs antivirus scanning or IPsec tunneling. For example, when the incoming traffic enters network 606, FortiClient 1002 does the anti-virus scanning before allowing the traffic to enter into network 606. In another example, when the user tries to access certain content over the public Internet, then FortiClient 1002 first establishes the secure channel between client device 602 and the outside network 613. In various other embodiments, FortiClient 1002 does endpoint checking.

In certain cases, where FortiClient 1002 is not present with client device 602, proxy module 608 or FortiGate notifies the user about the blocked content. The notification message may be displayed immediately after the request is blocked, or may be displayed within a specified time interval (e.g., within about 5 to 10 minutes).

In certain circumstance, FortiGate 1004 can be replaced by a gateway from any other vendor. Then, a separate communication channel is established between client device 602 and FortiGate 1004 so that FortiGate 1004 can notify users about the blocked content.

Referring to the above condition, if the request is allowed, proxy module 608 communicates it to FortiGate 1004 which then sends the request to server 614 hosted over the network 613—Internet. The requested content is retrieved from server 614 and displayed on client device 602.

In certain implementations, FIG. 10 may include an end-point check module (not shown). Firewall 106 will notify the end-point check module and the end-point check module sends notification to FortiClient 1002. FortiClient 1002 then displays the appropriate message to the user.

For simplifying the embodiment discussed in FIG. 10, an example is described. It is considered that the user wishes to access the content—GoogleDocs.com. The request is received by proxy module 608 through network 606. Proxy module 608 evaluates the request based on the policies and decides to block that requested content. Proxy module 608 then retrieves a pre-defined message from database 610 and communicates the information to FortiClient 1002. Forti- Client 1002 then embeds the toolbar with the pre-defined message and displays it to the user. One exemplary message may be—"You are not allowed to connect to the public Internet as the license of security software license is expired. Please contact your administrator for further actions". In such cases, the user can get in touch with the concerned department and get the security software license renewed.

As shown, functionalities of proxy module 608 be incorporated into FortiGate 1004 and thus, a single unit may be formulated to perform the aforementioned techniques.

Figure 9:
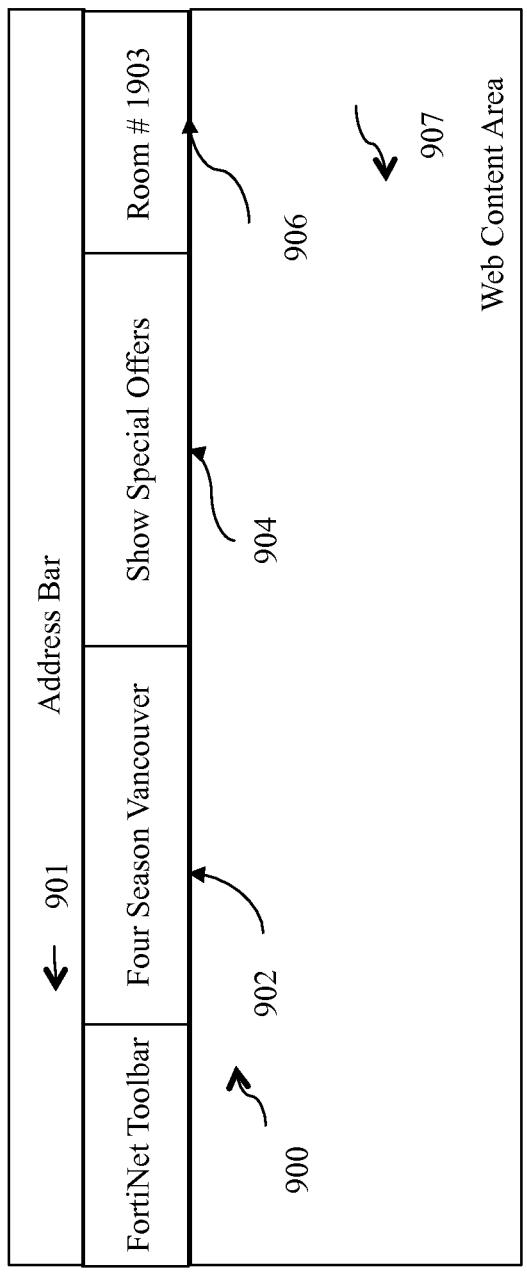
FIG. 9 demonstrates a toolbar employed in a hotel environment, displaying various events to a user, in accordance with an embodiment of the present invention.

Embodiments of the present invention can be used in various business areas, corporate networks, hotels, stores, or so on. FIG. 9 shows a toolbar 900 in accordance with an embodiment of the present invention which can be implemented in Hotel environments. Here, FIG. 9 shows a conventional web page that includes address bar 901, web content area 907, but with respect to the present invention, FIG. 9 shows toolbar. Toolbar 900 embedded in an application (such as application 604 of FIG. 6) displays various information—902, 904 and 906. The field 902 being the name of the Hotel, 904 represents special offers for the user and 906 shows the room number of the user. In detail, toolbar 900 will henceforth be discussed with reference to both FIG. 6A and FIG. 9. In order to implement such a toolbar, proxy module 608 intercepts the request originating from client device 602. Proxy module 608 scans the request to identify: the type of request, the source address of client device 602, etc. Examples of type of request include, but are not limited to, search for new travel packages, menu of the hotel, and special offers. The source address can be used to track the room number or floor. Database 610 of proxy module 608 stores a list of offers provided by the hotel, the bargain offers on accessories, travel packages, etc. Proxy module 608 correlates the list of offers with the information obtained post request interception, and displays appropriate messages to the user. Examples of the message (not shown in FIG. 9) are, but not limited to, "10% discount on drinks during Happy Hours", "A complementary package on order over USD 1000", etc.

Figure 11:
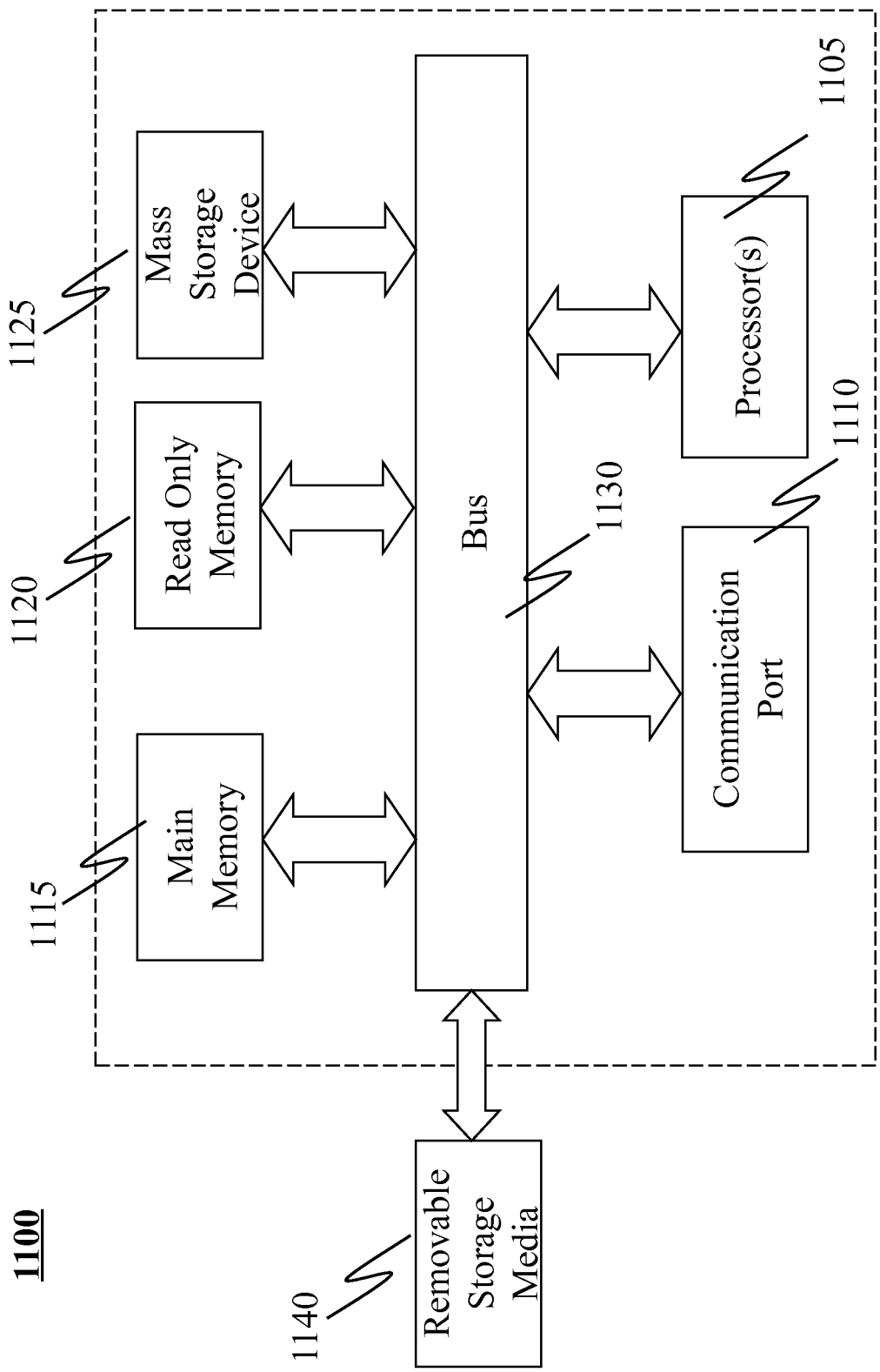
FIG. 11 is an exemplary computer system in which or with which embodiments of the present invention may be utilized.

FIG. 11 is an exemplary computer system in which or with which embodiments of the present invention may be utilized. Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 11 is an example of a computer system 1100, such as a workstation, personal computer, laptop, a network security device, such as a firewall, a gateway, a unified threat management (UTM) appliance or the like management, upon which or with which embodiments of the present invention may be employed.

According to the present example, the computer system includes a bus 1130, one or more processors 1105, one or more communication ports 1110, a main memory 1115, a removable storage media 1140, a read only memory 1120 and a mass storage 1125.

Processor(s) 1105 can be any future or existing processor, including, but not limited to, an Intel® Itanium® or Itanium 2 processor(s), or AMDC®, Opteron® or Athlon MP® processor(s), or Motorola® lines of processors. Communication port(s) 1110 can be any of an RS-232 port for use with a modem based dialup connection, a 10/100 Ethernet port, a Gigabit port using copper or fiber or other existing or future ports. Communication port(s) 1110 may be chosen depending on a network, such a Local Area Network (LAN), Wide Area Network (WAN), or any network to which the computer system 1100 connects.

Main memory 1115 can be Random Access Memory (RAM), or any other dynamic storage device(s) commonly known in the art. Read only memory 1120 can be any static storage device(s) such as Programmable Read Only Memory (PROM) chips for storing static information such as start-up or BIOS instructions for processor 1105.

Mass storage 1125 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1130 communicatively couples processor(s) 1105 with the other memory, storage and communication blocks. Bus 1130 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 1105 to system memory.

Optionally, operator and administrative interfaces, such as a display, keyboard, and a cursor control device, may also be coupled to bus 1130 to support direct operator interaction with computer system 1100. Other operator and administrative interfaces can be provided through network connections connected through communication ports 1110.

Removable storage media 1140 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the invention.

What is claimed is:

1. A method comprising:
  establishing a communication channel between an endpoint protection suite running on a client device associated with a protected network and a network security device within the protected network, wherein the endpoint protection suite protects the client device and the protected network by ensuring the client device complies with security requirements of the protected network and performs security features including web content filtering, wherein the network security device comprises a filtering device, a network gateway device or a unified threat management (UTM) appliance that protects the client device and the protected network by performing firewall functionality and wherein the communication channel is for communicating information regarding policy violations associated with requests issued by the client device directed to servers external to the protected network and detected by the network security device;

receiving, by a proxy module running within the network security device, a request originated by an application running on the client device and directed to a server external to the protected network;

determining, by the proxy module, an action to take on the request based on a firewall policy of a plurality of firewall policies that matches a source Internet Protocol (IP) address, a destination IP address and a protocol associated with the request;

when the determined action is to allow the request, then allowing, by the proxy module, the request to be forwarded by the network security device to the destination IP address;

when the determined action is to block the request, then:
dropping, by the network security device, the request; and
obtaining, by the proxy, a predetermined notification message of a plurality of predetermined notification messages based on the matching firewall policy; and
notifying, by the proxy, the user of the client device regarding the determined action by sending, via the communication channel, the predetermined notification message to the endpoint protection suite, which causes the predetermined notification message to be displayed to the user by embedding the predetermined notification message into a toolbar presented within the application.

2. The method of claim 1, wherein the application comprises a web browser and wherein the request comprises a Hypertext Transfer Protocol (HTTP) request.

3. The method of claim 1, wherein the application comprises an electronic mail (email) client and wherein the protocol comprises Simple Mail Transfer Protocol (SMTP), Post Office Protocol 3 (POP3) or Internet Message Access Protocol (IMAP).

4. The method of claim 1, wherein the application comprises a file transfer application and wherein the protocol comprises File Transfer Protocol (FTP).

5. The method of claim 1, wherein the endpoint protection suite and the network security device are products available from a common vendor and wherein the communication channel uses a proprietary protocol of the common vendor.

6. A non-transitory computer-readable storage medium embodying instructions, which when executed by one or more processors of a network security device within a protected network, cause the network security device to perform a method comprising:

establishing a communication channel between an endpoint protection suite running on a client device associated with the protected network and the network security device, wherein the endpoint protection suite protects the client device and the protected network by ensuring the client device complies with security requirements of the protected network and performs security features including web content filtering, wherein the network security device comprises a filtering device, a network gateway device or a unified threat management (UTM) appliance that protects the client device and the protected network by performing firewall functionality and wherein the communication channel is for communicating information regarding policy violations associated with requests issued by the client device directed to servers external to the protected network and detected by the network security device;

receiving, by a proxy module running within the network security device, a request originated by an application running on the client device and directed to a server external to the protected network;

determining, by the proxy module, an action to take on the request based on a firewall policy of a plurality of firewall policies that matches a source Internet Protocol (IP) address, a destination IP address and a protocol associated with the request;

when the determined action is to allow the request, then allowing, by the proxy module, the request to be forwarded by the network security device to the destination IP address;

when the determined action is to block the request, then:
dropping the request;
obtaining, by the proxy, a predetermined notification message of a plurality of predetermined notification messages based on the matching firewall policy; and
notifying, by the proxy, a user of the client device regarding the determined action by sending, via the communication channel, the predetermined notification message to the endpoint protection suite, which causes the predetermined notification message to be displayed to the user by embedding the predetermined notification message into a toolbar presented within the application.

7. The non-transitory computer-readable storage medium of claim 6, wherein the application comprises a web browser and wherein the request comprises a Hypertext Transfer Protocol (HTTP) request.

8. The non-transitory computer-readable storage medium of claim 6, wherein the application comprises an electronic mail (email) client and wherein the protocol comprises Simple Mail Transfer Protocol (SMTP), Post Office Protocol 3 (POP3) or Internet Message Access Protocol (IMAP).

9. The non-transitory computer-readable storage medium of claim 6, wherein the application comprises a file transfer application and wherein the protocol comprises File Transfer Protocol (FTP).

10. The non-transitory computer-readable storage medium of claim 6, wherein the endpoint protection suite and the network security device are products available from a common vendor and wherein the communication channel uses a proprietary protocol of the common vendor.

11. A network security device comprising:
a non-transitory storage device having embodied therein instructions; and
one or more processors coupled to the non-transitory storage device and operable to execute the instructions to perform a method comprising:
establishing a communication channel between an endpoint protection suite running on a client device associated with a protected network that is protected by the network security and the network security device, wherein the endpoint protection suite protects the client device and the protected network by ensuring the client device complies with security requirements of the protected network and performs security features including web content filtering, wherein the network security device comprises a filtering device, a network gateway device or a unified threat management (UTM) appliance that protects the client device and the protected network by performing firewall functionality and wherein the communication channel is for communicating information regarding policy violations associated with requests issued by the client device directed to servers external to the protected network and detected by the network security device;

receiving a request originated by an application running on the client device and directed to a server external to the protected network;

determining an action to take on the request based on a firewall policy of a plurality of firewall policies that matches a source Internet Protocol (IP) address, a destination IP address and a protocol associated with the request;

when the determined action is to allow the request, then allowing the request to be forwarded by the network security device to the destination IP address;

when the determined action is to block the request, then:
dropping the request;
obtaining a predetermined notification message of a plurality of predetermined notification messages based on the matching firewall policy; and
notifying a user of the client device regarding the determined action by sending, via the communication channel, the predetermined notification message to the endpoint protection suite, which causes the predetermined notification message to be displayed to the user by embedding the predetermined notification message into a toolbar presented within the application.

12. The network security device of claim 11, wherein the application comprises a web browser and wherein the request comprises a Hypertext Transfer Protocol (HTTP) request.

13. The network security device of claim 11, wherein the application comprises an electronic mail (email) client and wherein the protocol comprises Simple Mail Transfer Protocol (SMTP), Post Office Protocol 3 (POP3) or Internet Message Access Protocol (IMAP).

14. The network security device of claim 11, wherein the application comprises a file transfer application and wherein the protocol comprises File Transfer Protocol (FTP).

15. The network security device of claim 11, wherein the endpoint protection suite and the network security device are products available from a common vendor and wherein the communication channel uses a proprietary protocol of the common vendor.

* * * * *